Patented Jan. 10, 1939

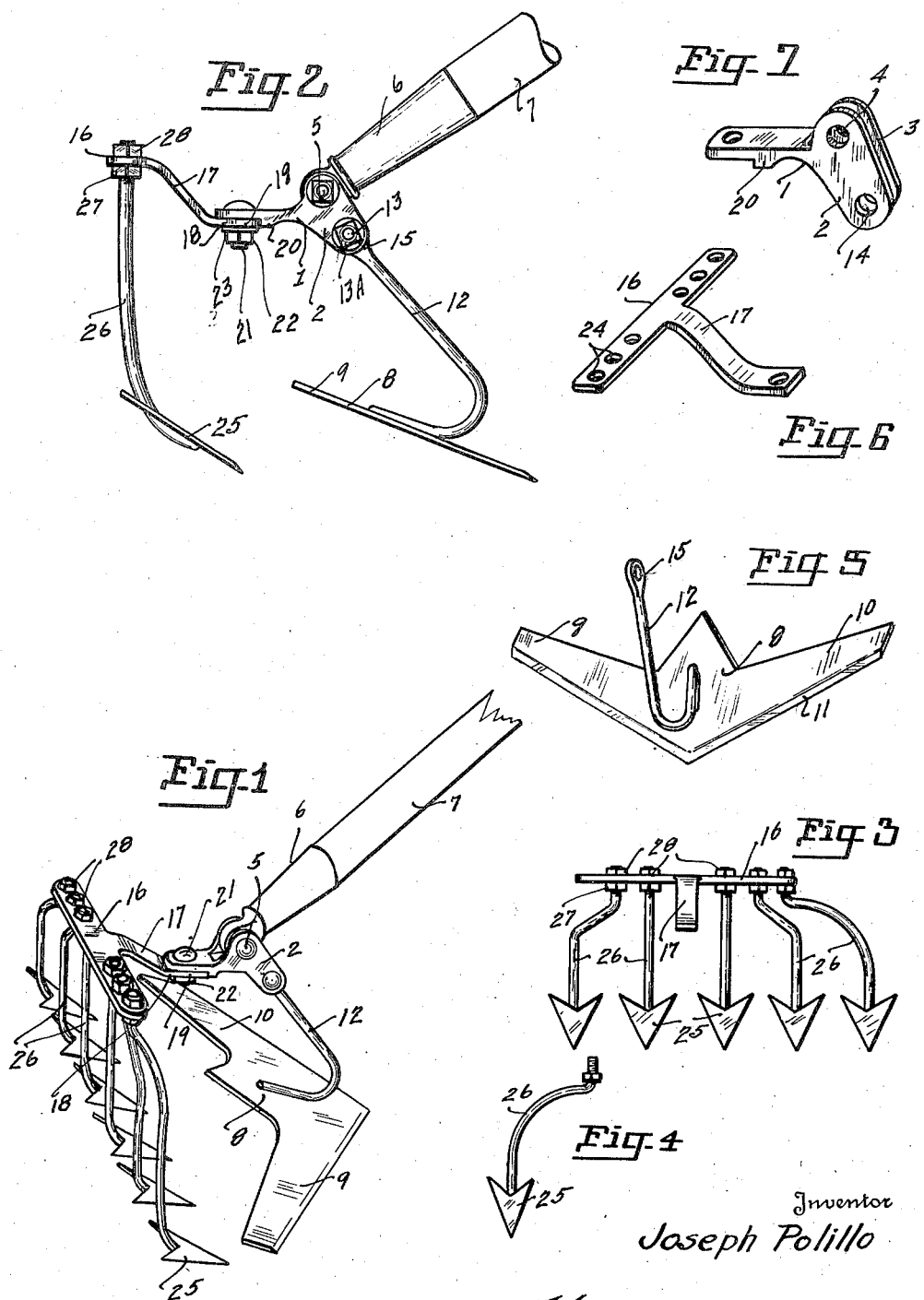

2,143,660

UNITED STATES PATENT OFFICE 2,143,660

COMBINATION HAND WEEDER AND CULTIVATOR

Joseph Polillo, Ridgefield, Wash.

Application December 11, 1936, Serial No. 115,299

1 Claim. (Cl. 97—62)

My invention relates to hand weeders and cultivators in which a bifurcated supporting head or frame has a handle adjustably secured thereto and means are provided for clamping the handle to the supporting head or frame.

A weeder hoe is adjustable relative to the head, or frame and a plurality of spaced hoes are removably and adjustably secured to the head, or frame. The device may be used as a weeder. It may be used as a cultivator or it may be used as a combined weeder and cultivator.

The primary object of my invention consists in providing a combination tool for the use of a hand gardener which may be used as a cultivator or as a weeder or as a push or pull hoe. It may be used as a cultivator or it may be used as a weeder and cultivator in a single tool and through the use of which the surface to be treated may be weeded and cultivated in a single passage of the tool over the surface to be weeded and cultivated.

A still further object of my invention consists in simply constructing the device and of a minimum number of parts. It may be used as a hand cultivating and weeding hoe. Through the use of the device the garden may be kept in a highly efficient condition and through hand use. Through the use of the combination tool maximum cultivating and weeding results may be obtained in a minimum of time.

A still further object of my invention consists in so constructing the device that it may be easily repaired and quickly adjusted to meet the requirements of the user of the same.

With these and incidental objects in view, the invention consists in certain novel features of construction and combination of parts, the essential elements of which are set forth in the appended claim, and a preferred form of embodiment of which is hereinafter shown with reference to the drawing which accompanies and forms a part of this specification.

In the drawing:

Fig. 1 is a fragmentary perspective plan side view of the assembled device.

Fig. 2 is a side view of the mechanism illustrated in Fig. 1.

Fig. 3 is a front view of the cultivator head assembly.

Fig. 4 is a front view of one of the cultivator units shown removed from its supporting frame.

Fig. 5 is a perspective, top plan view of the weeder hoe shown removed from the assembly.

Fig. 6 is a perspective side view of the cultivator supporting head.

Fig. 7 is a perspective side view of the frame to which the weeder head and cultivator head are secured and to which the handle is also secured.

Like reference characters refer to like parts throughout the several views.

My device is primarily comprised of a central supporting frame 1. The frame is furcated on its forward end having jaws 2 and 3 spaced apart upon its furcated end. A hole 4 extends through the jaws 2 and 3 and through which a fastening bolt 5 passes. A handle receiving socket 6 is journaled relative to the fastening bolt 5 and is adapted to be raised and lowered between the jaws 2 and 3 and for being clamped in placement relative thereto by the fastening journal bolts 5. A handle 7 is removably secured to the socket 6. A weeder hoe 8 is provided. The weeder hoe has wings 9 and 10 disposed at each side of the central section and a cutting edge 11 is provided at the forward cutting edge of the weeder hoe. The front edge of the weeder hoe is V-shaped to facilitate its handling and adjustment. A supporting bar 12 is secured upon its lower end centrally of the weeder hoe. Its oppositely disposed end is placeable between the jaws 2 and 3 of the head and is journaled and adjusted relative thereto by a fastening bolt and nut 13. The fastening bolt 13 passes through holes 14 disposed within the jaws 2 and 3 of the head and through a receiving hole 15 disposed within the supporting bar 12. The bar 12 and the hoe may be adjustably positioned within the head and clamped relative thereto by the fastening bolt 13 and its associated nut 13A. A cultivator supporting head 16 is provided. The cultivator supporting head 16 has a shank 17 forwardly extending therefrom and the shank is offset to provide a supporting surface 18 that may be positioned relative to the receiving surface 19 of the head 1. A lug 20 downwardly extends from the underside of the head 1 and the inner end of the shank 17 abuts thereagainst. A fastening bolt 21 secures the shank to the head 1. Locking nut 22 and a locking washer 23 secure the shank in locked placement relative to that of the head 1.

A plurality of spaced holes 24 extend through the cultivator supporting head 16. Cultivator shovels 25 are adjustably positionable within the respective holes. The cultivator shovels 25 have shanks 26 upwardly and rearwardly extending therefrom and a positioning nut 27 is threadably placeable upon the upper end of the shank 26. The upper end of the shank passes through the spaced holes 24 and the shovel and shank are locked relative to the supporting head by nuts 28 that are secured to the upper end of the respective shanks.

I have here shown the cultivator hoe of a shape of a well known embodiment but I do not wish to be limited to the embodiment herein shown as any other cultivator of the plow type. Any other type of cultivator may be used with equal facility. The type to be used depending on the class of soil in which the same is to be used and the vegetation that is to be cultivated.

The inclination of the weeder hoe and of the cultivator shovels is determined by the relative position of the handle 7 and the socket 6 to that of the head 1.

By removal of the weeder hoe from the assembly the device may be used as a cultivator only and by the removal of the cultivator shovels from the assembly, the device may be used as a weeder hoe only. It may be used as a cultivator and weeding tool in a single operation by the securing of the two units to the common head.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claim which follows.

What I claim is:

In a device of the class described, the combination of a central furcated frame, spaced jaws disposed upon the furcated end of the central frame, a pair of holes disposed within and extending through the top and bottom ends of the spaced jaws, a fastening and clamping bolt and nut associated with each of the pair of holes, a handle receiving socket adjustably secured to one of the bolts and a weeder hoe supporting bar adjustably secured to the other of the bolts, a weeder hoe disposed upon the lower end of the weeder hoe supporting bar, a cultivator supporting head, a shank forwardly extending from the supporting head, means for clamping the supporting head to the frame, a plurality of spaced holes extending through the supporting head and a cultivator removably secured to the head at each of the holes.

JOSEPH POLILLO.